United States Patent
Baeuerle (10) Patent No.: US 10,358,360 B2
(45) Date of Patent: Jul. 23, 2019

(54) PURIFICATION OF OIL-POLLUTED WATER AND DEVICE SUITABLE THEREFOR

(71) Applicant: EVIOLA S.A., Luxembourg (LU)

(72) Inventor: Ulrich Baeuerle, Pliezhausen (DE)

(73) Assignee: EVIOLA S.A., Luxembourg (LU)

( * ) Notice: Subject to any disclaimer, the term of this patent is extended or adjusted under 35 U.S.C. 154(b) by 449 days.

(21) Appl. No.: 14/442,710

(22) PCT Filed: Nov. 12, 2013

(86) PCT No.: PCT/EP2013/073595
§ 371 (c)(1),
(2) Date: May 13, 2015

(87) PCT Pub. No.: WO2014/076068
PCT Pub. Date: May 22, 2014

(65) Prior Publication Data
US 2016/0297692 A1    Oct. 13, 2016

(30) Foreign Application Priority Data

Nov. 13, 2012    (EP) ..................... 12192334

(51) Int. Cl.
*B01D 61/16* (2006.01)
*C02F 1/52* (2006.01)
(Continued)

(52) U.S. Cl.
CPC .............. *C02F 1/444* (2013.01); *B01D 61/16* (2013.01); *B01D 65/08* (2013.01); *C02F 1/5245* (2013.01);
(Continued)

(58) Field of Classification Search
CPC ...... B01D 61/145; B01D 61/16; B01D 65/08; B01D 2311/04; B01D 2321/04;
(Continued)

(56) References Cited

U.S. PATENT DOCUMENTS

| | | | |
|---|---|---|---|
| 2006/0175256 A1* | 8/2006 | Masten | B01D 61/04 210/638 |
| 2010/0147763 A1* | 6/2010 | Tsou | B01D 67/0083 210/500.21 |
| 2011/0155666 A1* | 6/2011 | Prakash | B01D 61/04 210/641 |

FOREIGN PATENT DOCUMENTS

| | | |
|---|---|---|
| CN | 201578930 U | 9/2010 |
| CN | 102225812 A | 10/2011 |

(Continued)

OTHER PUBLICATIONS

Tansel, et al., "Treatment of fuel oil and crude oil contaminate waters by ultrafiltration membranes," 1995, Desalination, 102:301-311, 11 pages.*

(Continued)

*Primary Examiner* — Patrick J Orme
(74) *Attorney, Agent, or Firm* — Cantor Colburn LLP (57) ABSTRACT

In a method for purifying an oil (8)/water (42) mixture (40), the mixture (40) is fed to a container (48) having an ultrafiltration unit (52) with a membrane (30), and a protective material (50) is added to the mixture (40), which protective material, directly or after chemical reaction with the water from the mixture (40), as a film (62) on the membrane (30), keeps free oil (8) away from said membrane. Purified process water for extracting and/or refining of petroleum (8) is thus produced from process water (42) which is contaminated with petroleum (8). A purification device (64) substantially comprises a container (48) having an ultrafiltration unit (52) with a membrane (30), a feed line (28) to the container (48) and an addition device (27) for protective material (50) in the flow path (56) to the membrane (30).

18 Claims, 3 Drawing Sheets

(51) Int. Cl.
*C02F 1/44* (2006.01)
*B01D 65/08* (2006.01)
*C10G 31/08* (2006.01)
*E21B 43/20* (2006.01)
*E21B 43/40* (2006.01)
*C02F 101/32* (2006.01)
*C02F 103/36* (2006.01)
*C02F 103/10* (2006.01)

(52) U.S. Cl.
CPC .............. *C10G 31/08* (2013.01); *E21B 43/20* (2013.01); *E21B 43/40* (2013.01); *B01D 2321/04* (2013.01); *B01D 2321/16* (2013.01); *B01D 2321/2091* (2013.01); *C02F 1/52* (2013.01); *C02F 2101/32* (2013.01); *C02F 2103/10* (2013.01); *C02F 2103/365* (2013.01); *C02F 2303/16* (2013.01); *C10G 2300/1033* (2013.01); *C10G 2300/202* (2013.01); *C10G 2300/805* (2013.01)

(58) Field of Classification Search
CPC .......... B01D 2321/16; B01D 2321/209; C02F 1/444; C02F 1/52; C02F 1/5245; C02F 2101/32; C02F 2103/10; C02F 2103/365; C02F 2303/16; C10G 31/08; C10G 2300/1033; C10G 2300/202; C10G 2300/805; E21B 43/20; E21B 43/40
See application file for complete search history.

(56) References Cited

FOREIGN PATENT DOCUMENTS

| CN | 202070289 U | 12/2011 | | |
|---|---|---|---|---|
| CN | 102718287 A | 10/2012 | | |
| DE | 4411691 C1 | 3/1995 | | |
| DE | 102009028162 A1 | * | 2/2011 | ........... B01D 61/145 |
| DE | 102009028162 A1 | | 2/2011 | |

OTHER PUBLICATIONS

Zhong, et al., "Treatment of oily wastewater produced from refinery processes using flocculation and ceramic membrane filtration," 2003, Separation and Purification Technology, 32:93-98, 6 pages.*
DE102009028162A1—EPO Machine Translation, 8 pages. (Year: 2018).*
International Preliminary Report on Patentability dated Feb. 25, 2015 re: Application No. PCT/EP2013/073595.
CN Office Action dated Feb. 3, 2016 re: Application No. 2013800588801; pp. 1-45.
A. Fakhru 'L-Razi et al. "Review of technologies for oil and gas produced water treatment", Journal of Hazardous Materials, Oct. 30, 2009, vol. 170, No. 2-3, pp. 530-551.
B. Tansel et al. "Treatment of fuel oil nd crude oil contaminated waters by ultrafiltration membranes", Desalination, Oct. 1, 1995, vol. 102, No. 1, pp. 301-311.
International Search Report dated Dec. 3, 2013 re: Application No. PCT/EP2013/073595.
J. Mueller et al. "Crossflow microfiltration of oily water" Journal of Membrane Science, Jul. 9, 1997, vol. 129, No. 2, pp. 221-235.
Jing Zhong et al. "Treatement of oily wastewater produced from refinery processes using flocculation and ceramic membrane filtration", Separation and Purification Technology, Jul. 1, 2003, vol. 32, O. 1-3, pp. 9398.
M. Cheryan et al. "Membrane processing of oily streams, Wastewater treatment and waste reduction", Journal of Membrane Science, Dec. 9, 1998, vol. 151, No., pp. 13-28.
S. Panpanit et al. "The role of bentonite addition in UF flux enhancement mechanisms for oil/water emulsion" Journal of Membrane Science, Mar. 1, 2001, vol. 184, No. 1, pp. 59-68.

* cited by examiner

PURIFICATION OF OIL-POLLUTED WATER AND DEVICE SUITABLE THEREFOR

TECHNICAL FIELD

The invention relates to a method and a device for purifying a mixture of water contaminated with oil, and to a method for producing purified process water during the extraction and/or refining of petroleum.

BACKGROUND

Extracting petroleum essentially involves extracting a petroleum/water mixture from the ground. In newly developed oil fields, this mixture consists of the formation water already present in the oil-bearing stratum and the oil which is to be extracted. In older oil fields, extraction of the petroleum/water mixture involves forcing water into the petroleum formation through injection wells which are located at a certain distance from the extraction well. Under the pressure developed in this manner, the water flows in the oil-bearing stratum to the extraction well and, in so doing, carries petroleum with it which may then be taken from the extraction well together with the injection water and any formation water which is present.

This petroleum/water mixture now has to be separated in order to obtain petroleum which is suitable for further processing. The water content of the petroleum/water mixture varies from oil field to oil field and also varies as exploitation of the oil field progresses.

When refining petroleum, oil products containing salt for example must be desalted. The oil product is washed with water for this purpose. Water contaminated with oil is obtained as waste product.

Oil/water mixtures are very harmful to the environment and therefore cannot be discharged untreated into the environment, for example requiring elaborate disposal arrangements. It is therefore in principle desirable to treat oil/water mixtures by separating the oil as completely as possible from the water in order to obtain clarified water which may then for example be put to further use.

Phase separators are generally used for separating the oil/water mixture, i.e. the oil/water mixture is transferred into a tank in which the lighter oil and the heavier water can segregate under the influence of gravity, such that an oil phase forms at the surface and an aqueous phase (for example deposit water in the case of petroleum extraction) in the lower region of the tank.

After such a gravity separation, between 500 and 1000 mg of oil are still present per liter of water. On the one hand, this involves a considerable waste of precious oil and, on the other hand, the water cannot be discharged into the environment due to the considerable contamination with oil but must instead be further treated and purified.

Currently available treatment methods and devices, however, have considerable disadvantages with regard to costs and treatment performance. In the case of the three-phase separators usual in the United Arab Emirates, a residual oil content of 500 ppm oil remains in the wastewater. Disposal of the water is extremely problematic at such a high loading. Sometimes the water is transferred into special wastewater lagoons which involves considerable environmental pollution. Alternatively, the wastewater is sometimes forced under elevated pressure into porous aquifers. While this practice does indeed initially get rid of the water, it makes groundwater deposits useless for future extraction of drinking water.

In German oil fields, the residual oil content is often reduced to around 60 ppm by means of coalescence separators. However, even this loading is still too high for direct discharge of the water, such that here too the water can only be discharged to an effluent treatment plant, so causing considerable additional costs.

A solution which is at first glance obvious in petroleum extraction of using the contaminated deposit water as injection water for the injection wells is in many cases likewise not possible due to the residual oil content of the water. If injected into the oil field, the oil particles can clog the pores in the oil-bearing formation and so considerably reduce output from the oil field and, in extreme cases, may bring extraction to a virtual standstill. Even if it is possible to force the deposit water back into the oil field, there are further related problems. This is because, if the contaminated water is to be safely stored, it would have to be forced precisely into the conductive oil-bearing reservoir which has been developed by the extraction well. Such precise input is, however, almost impossible to ensure reliably. There is therefore always a risk that the introduced deposit water will not remain in the oil field, but will instead be forced into other rock strata where it may cause contamination, in extreme cases in the aquifer too.

Ultrafiltration of deposit water containing oil has repeatedly been investigated. However, such investigations revealed the problem that the membranes used are likewise irreversibly clogged by the oil particles within a short time. While using ceramic membranes has made backflushing feasible, such that the membranes can be used over an extended period, the service period of these special ceramic membranes between flushing operations is very short and the membrane costs are very high. Methods using these membranes can thus only be considered in a few specific cases involving relatively small volumes of deposit water.

BRIEF SUMMARY

The invention provides a device and a method with which the residual oil content of the water can be reduced considerably below currently feasible values, in order for example to enable further use of the deposit water for example as injection water or for generating process steam. The invention is intended to permit long run times with few interruptions for maintenance while simultaneously being possible to carry out at low cost. The intention is moreover also to provide an improved method for producing purified process water for extracting and/or refining petroleum as well as for extracting and/or refining petroleum.

In a method for purifying a mixture of water contaminated with oil, the mixture is fed to a container which comprises an ultrafiltration unit with a membrane. During purification, an additive is added to the mixture on a flow path towards the membrane, which additive reacts with the mixture or with the water, wherein a hydrophilic reaction product arises as a protective material (50), and wherein the protective material rests on the membrane as a film and so keeps free oil in the mixture away from the membrane. The mixture is then purified to yield clarified water on passage through the membrane. The clarified water is discharged from the ultrafiltration unit downstream of the membrane. The mixture remaining in the container is concentrated in oil content by clarified water being drawn off. Said mixture is discharged from the container.

The invention thus ensures that, during purification of the oil/water mixture, the membrane is coated with a film in the manner of a secondary membrane taking the form of the protective material. This is a film which is applied during operation which does not adhere permanently to the membrane but may instead be renewed or backflushed. The previous problem of the membrane being extremely rapidly clogged with free oil particles is avoided because the oil particles are kept away by the protective material.

By controlled addition of the additive, the protective material can be fed to the membrane for example continuously and/or for periods of time and/or at time intervals. The additive is added upstream in the inflow path of the oil/water mixture to the membrane. The hydrophilic reaction product which arises after reaction with the water then comes into contact with the membrane where it can rest.

The oil/water mixture for the method originates for example from a prepurification stage, in which the original oil content in the water has already been reduced, for example a gravity phase separator or another physically operating phase separator.

According to the invention, the oil/water mixture is thus fed to ultrafiltration, wherein, in order to assist ultrafiltration, a protective material is apportioned to the mixture prior to being fed to the ultrafiltration, which protective material, directly or after chemical reaction with the water from the mixture, as a film on the membrane, keeps free oil away from said membrane.

Hollow fiber membranes, which are inexpensive to manufacture and offer a large membrane area while occupying little space, may be used as the membrane for the ultrafiltration stage. These membranes are constructed such that, when water flows towards them, only the water molecules can pass through the membrane pores, while the larger hydrocarbons, of which the oil contains, are retained. The membrane may for example comprises polymers.

The clarified water may then be taken from the ultrafiltration stage. Said clarified water now only comprises hydrocarbons which are dissolved in water. Solids or free or emulsified oil are completely separated. The clarified water is thus sufficiently pure to be used, for example, as injection water for injection wells in petroleum extraction without there being any risk of the pore spaces in the oil field becoming clogged. The clarified water taken from the ultrafiltration is furthermore also sterilized. This is of great significance to its suitability as injection water, since microorganisms decompose the petroleum stored in the oil field and could thus destroy the oil field. Even if it is not used as injection water, further processing, for example in an effluent treatment plant, is simplified by the greatly reduced residual oil content and can be carried out more inexpensively. After further treatment for desalting, for example by reverse osmosis, the clarified water may also be used for further purposes, such as for example as boiler feed water in petroleum processing.

Since clarified water is taken from the ultrafiltration stage, the residual oil is again concentrated in the remaining aqueous phase. This aqueous phase with a concentrated residual oil content is for example fed back into the method. The concentrated mixture may, however, also be fed back into a prepurification stage which is still capable of effectively separating water with a relatively high oil content.

Flow, by means of which the oil/water mixture is repeatedly passed by the membrane, may in particular be generated in the container. This further increases filter performance.

In one possible embodiment, an additive which contains the protective material is added to the mixture. The protective material is thus fed directly into the oil/water mixture in pure form or as part of an additive and is deposited in unchanged form on the membrane.

In a preferred embodiment, an additive is added to the mixture, wherein the protective material is not formed until the additive has reacted with the mixture. The reaction may here be of a chemical or also physical nature, for example agglomeration or the like. In this variant of the invention, the transport time of the additive from the addition thereof to the oil/water mixture until it comes into contact with or adheres to the membrane is selected suitably for the reaction to occur to the desired extent. The transport time is selected, for example, by selecting the place of addition and/or selecting the flow velocity of the oil/water mixture.

In a preferred variant, a precipitating agent which interacts with water is used as the additive. The fundamental reaction is here the production of a precipitating agent product in the water, but an actual precipitation in the conventional meaning does not occur. Precipitation of the protective agent on reaction of the additive with the water gives rise to very small flocs in the µm range which are deposited on the membrane. The flocs are accordingly only used for their property as a protective material, which is deposited on the membrane but not on the oil droplets and also does not react with the oil.

Iron(III) chloride, $FeCl_3$, is preferably used as the additive. This additive reacts with the water of the mixture and gives rise to minuscule iron hydroxide particles $[Fe(OH)_3]$ as protective agent which rest on the membrane in the form of micro- or nanoparticles. $Fe(OH)_3$ is insoluble in water and forms a very thin hydrophilic cover layer on the membrane which keeps the free oil and oil/water emulsion drops away from the membrane surface. The membrane thus cannot become clogged.

The same may also be achieved with aluminum chloride, $AlCl_3$, but in this case is only possible over a relatively narrow pH value range, since the aluminum hydroxide formed redissolves at both a higher and a lower pH value.

Since the micro- or nanoparticles are only used for their property as a protective material and not for a conventional precipitation, the additional material may be added in a concentration which is insufficient for a reaction with the oil on the basis of chemical or physical reactions. In other words, the quantity of oil separable by reaction is some orders of magnitude below the quantity of oil filtered by the membrane. For example, iron chloride is added in the range of a few mg/l. This concentration is insufficient to produce an emulsion, a significant proportion of oil is neither emulsified nor flocculated, but the significant proportion of oil is instead filtered on the secondary membrane which has been produced and is some orders of magnitude above the proportion of the oil which reacts with the added chemical. Even proportions of the additive which remain for an extended period in the oil/water mixture, for example because they are not deposited on the membrane, enter into no or only very slight reactions with the oil which do not have a significant effect on the filter result.

In a preferred variant, the additive is selected such that, after reaction with the water, hydrophilic ultrafine particles of a predefinable maximum size in the µm range are formed as the protective material. In other words, microflocs or nanoflocs are used. Hydrophilicity is selected such that substantially only water, but not free oil, is deposited on the film formed from the protective material. Water accordingly passes through the membrane, while oil is kept away from it.

In a further variant of the method, the mixture is fed to the container from a storage reservoir. The mixture discharged from the container is then recirculated into the storage reservoir. In this way, a circulation system is established in which the concentrated oil/water mixture is subjected to another passage through the method. In particular, as mentioned above, a prepurification stage may be operated in the circuit, for example in the region of the storage reservoir. The storage reservoir may accordingly for example take the form of a sump for gravity separation.

As mentioned, the protective material may preferably be removed by backflushing the membrane contrary to the direction of flow in which the water passes through the membrane in regular filter operation. This proceeds at intervals or when required. In this way, the membrane has the previous protective material removed from it and new protective material can be deposited.

With regard to a method for producing purified process water for extracting and/or refining petroleum, the invention provides a method where the purified process water is produced as clarified water using a method as stated above from water contaminated with oil. Contaminated process water from petroleum extraction or refining is used as the oil/water mixture. Such process water is for example known as "produced water" and/or "desalter water". "Clean" process water is thus produced from the contaminated process water. Feeding of freshwater during the extraction and/or refining of petroleum is therefore avoided or dramatically reduced.

In a preferred embodiment, the purified process water is used as boiler feed water and/or as desalting water and/or as other recycled water, i.e. water reprocessed by the above method, i.e. is fed, under certain circumstances once again, to these processes.

The purified process water may particularly advantageously be used for reinjection into an oil field during petroleum extraction.

With regard to the device for purifying a mixture of water contaminated with oil to yield clarified water, the invention is achieved by a device which contains a container which comprises an ultrafiltration unit with a membrane, a feed line, which opens into the container, for the mixture and an addition device for an additional material in such a manner that the additive reacts with the mixture, wherein a hydrophilic reaction product arises as a protective material which rests on the membrane as a film and so keeps free oil in the mixture away from the membrane. The addition device preferably opens into a flow path of the mixture towards membrane. The device also contains a clarified water line leading away downstream of the membrane from the ultrafiltration unit. Clarified water which has been purified on passage through the membrane is discharged through said line. A discharge line leading away from the container for mixture which has been concentrated in oil content is likewise part of the device.

Advantages of the device have already been explained mutatis mutandis on the basis of the method.

In a preferred embodiment, the addition device opens into the feed line. Addition may accordingly proceed particularly simply, since only the feed line need be provided with a corresponding connection.

The device may preferably comprise a storage reservoir, for example a sump for receiving deposit water. This deposit water generally originates from a phase separator, in which a separation of a petroleum/water mixture from petroleum extraction has already taken place, and generally has an oil content of 500 to 1000 mg/l. Other oil contents varying from said values which may range from 200 to 5000 mg/l are, however, also possible.

The most varied devices may be considered as sumps. In very general terms, the deposit water should already have been separated in the sump into recovered free oil and an aqueous phase with a lower oil content.

For the purposes of the invention, a settling tank, a lagoon or a tank in which further gravity separation is carried out may, for example, be used as the sump. In addition, lamella clarifiers, oblique tube clarifiers, rapid clarifiers or coalescence separators may be used. Pressure/release flotation may particularly advantageously be used as the sump. Air or gas bubbles are here introduced into the deposit water where they lead to a separation of oil and water. Three phases then form in the sump, the oil-containing phase on the surface, which may be discharged, a hydrous phase with a reduced residual oil content and, on the bottom of the sump, any entrained solids which are deposited as sludge and removed at regular intervals. The hydrous phase with a reduced residual oil content may then be taken from the sump and fed to the downstream ultrafiltration.

Further developments of the device have already been explained above mutatis mutandis in relation to the method.

BRIEF DESCRIPTION OF THE DRAWINGS

Further features, combinations of features, advantages and characteristics of the invention are revealed with reference to the following description of a preferred exemplary embodiment and in the drawings, in which.

DETAILED DESCRIPTION

Figure 1:
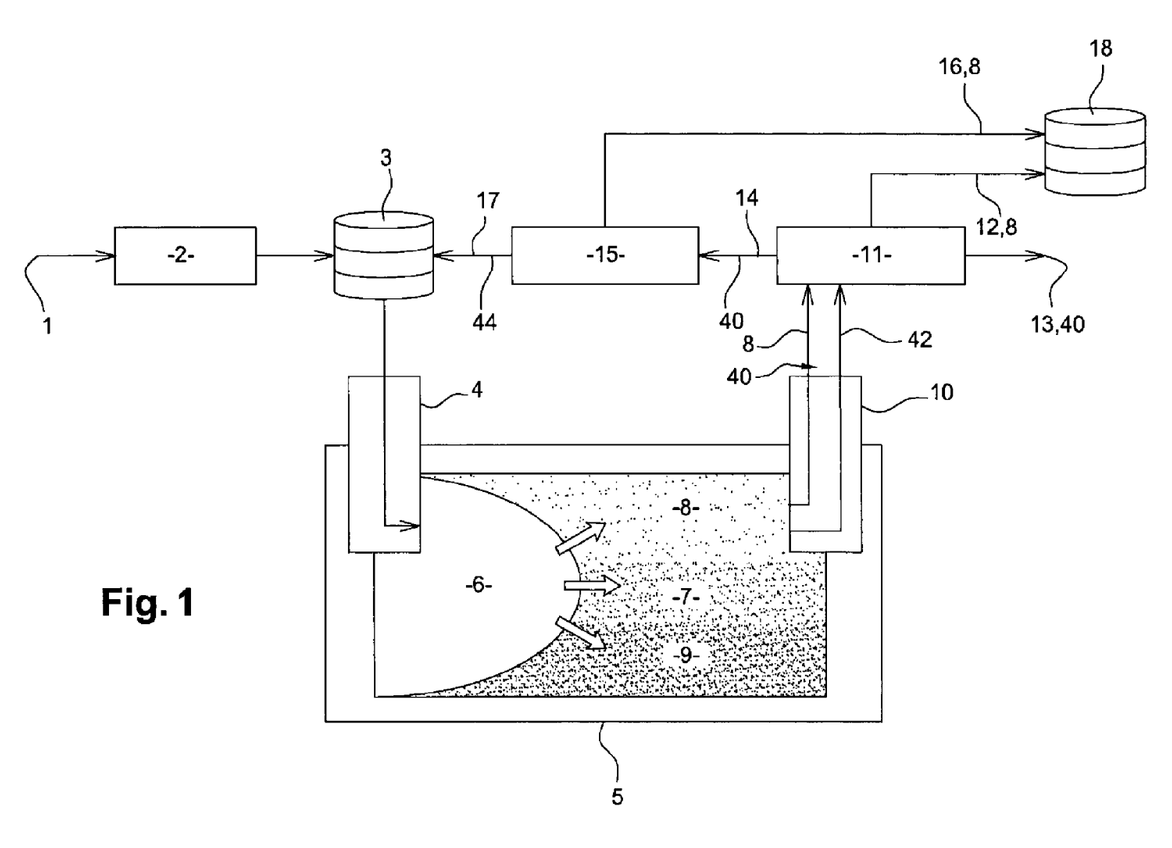
FIG. 1 is a schematic diagram of oil extraction in an oil field and of water processing during oil extraction.

FIG. 1 shows an external water source 1 (for example either an underground aquifer or seawater) from which water may be taken as injection water and, after treatment in a treatment plant 2 (for example seawater desalination), pumped via an injection well 4 into an oil field 5. In order to compensate fluctuations, the injection water may previously be held in intermediate storage in a tank 3. The introduced injection water results in the formation in the oil field 5 of a water bank 6 which presses an oil bank 7 towards an extraction well 10. The oil bank 7 is here composed of a proportion of oil 8, in this case petroleum, and a proportion of formation water 9. Due to its density, the oil 8 is located more in the higher part of the oil bank 7, while the formation water 9 is mainly stored in the lower zones thereof.

A mixture 40 of oil 8 and water 42 (process water, in this case formation water 9 and/or injection water) now emerges from the extraction well 10. Said mixture is subjected to separation in a first treatment stage 11. This generally proceeds in phase separators and is thus a gravity separation method. Separated oil 8 from the treatment stage 11 is stored in a tank 18 via a line 12, until it is conveyed onwards for further processing. A residual mixture 40 of water 42 still contaminated with oil 8 remains behind. In prior art plants, the mixture 40 is sent for injection into an aquifer, pumped away into disposal lagoons or fed to another external disposal facility such as for example industrial or municipal effluent treatment plants (indicated in the figure by the arrow 13).

It is at the present point that the present invention begins. Instead of being passed along the arrow 13, the mixture 40 is passed via a line 14 to a water treatment plant 15, where, according to the invention, it is treated or separated into oil 8 and water 42 (see FIG. 2). The oil 8 additionally obtained in this manner may be transferred via the line 16 into the tank 18, so increasing the overall oil extraction yield. Purified clarified water 44 may be transferred via a line 17 into the injection water tank 3 and used for injection into the oil field 5. There is thus no need go to the considerable cost of extracting and treating injection water from the water source 1 and at the same time an environmental impact due to contaminated water in the form of the mixture 40 from the oil extraction process is avoided.

Figure 2:
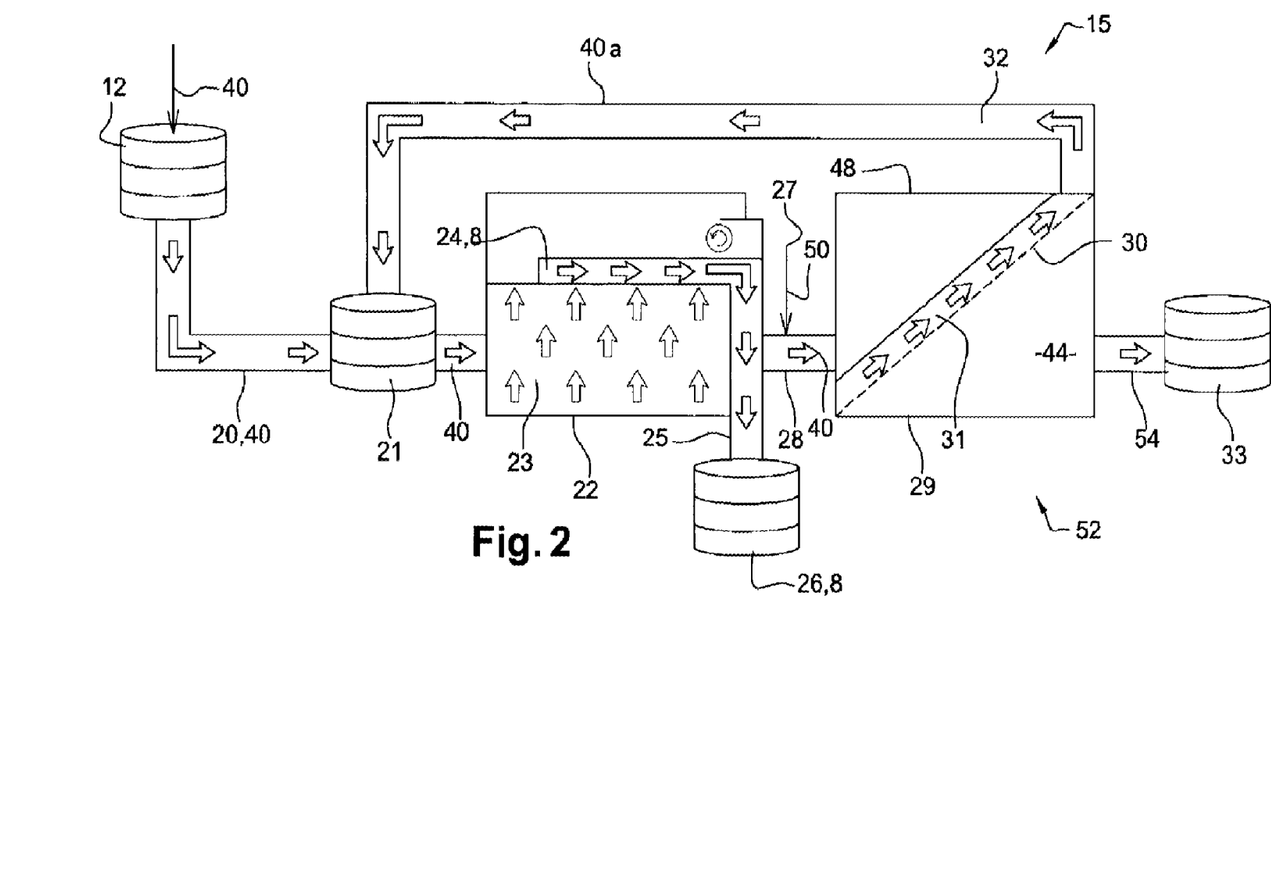
FIG. 2 is a schematic representation of a water treatment plant according to the invention.

FIG. 2 shows the water treatment plant 15 in detail. The incoming mixture 40 first reaches a gravity separation tank 12, from where it is passed via a line 20 into a storage reservoir 21 in the form of an oil recovery feed tank. From this storage reservoir 21, the mixture 40 is fed to a sump 22. In the embodiment shown, pressure/release flotation (Dissolved Air Flotation, DAF) with air bubbles is used in the sump 22. It is alternatively likewise possible to use a gas flotation or other separation method such as for example coalescence separators on the mixture 40 in the sump 22. In pressure/release flotation, finely divided gas bubbles are injected into the mixture 40 which rise upwards in the direction of the arrows 23 and, in so doing, "entrain" the particles of oil 8 as a result of the different surface wetting, such that an oil phase 24 of separated oil 8 forms on the surface. This oil phase 24 can be skimmed off or otherwise removed or discharged and is drawn off via a line 25 into a tank 26 for the recovered oil 8, from where it may be conveyed onward to the main oil tank in the form of the tank 18 in FIG. 1.

If the extraction plants are appropriately equipped, a separator or phase separator which is already present may also be used as the sump 22 providing that it is capable of achieving a sufficient reduction in oil content of the mixture 40. This is primarily the case for extraction plants which are already equipped with a multi-phase separator or flotation separation.

The mixture 40 with reduced oil content is discharged via a feed line 28 and fed to a container 48 of a concentration unit 29 or polishing unit. An addition device 27 for an additive with a protective material 50 opens into the feed line 28, by which means the protective material 50 is added to the mixture 40. Once the protective material 50 has been apportioned, the mixture 40 passes into the concentration unit 29. In or on the container 48, said concentration unit 29 has an ultrafiltration unit 52, the membrane 30 of which, in this case an ultrafiltration membrane, is in contact with the mixture 40. Said membrane 30 comprises a polymer membrane and is capable of retaining particles from a predefinable size, in the example with a size of greater than 0.02 μm. Any free particles, such as oil 8 or oil emulsion droplets but also solids and microorganisms in the mixture 40, are thus reliably retained.

In the example, the membrane 30 is used in cross-flow operation, i.e. the mixture 40 is guided along the membrane 30 at a relatively high velocity. Alternatively, dead-end operation is however also possible. In order to ensure the greatest possible filtration efficiency, it is advantageous in the case of cross-flow operation for the mixture 40 to be conveyed repeatedly past the membrane 30 in a recirculation method. As the mixture 40 is conveyed past the membrane 30, water molecules pass through the membrane 30 and are then discharged. Clarified water 44 is thus obtained in the ultrafiltration unit 52. Said clarified water 44 (permeate) is then free of free oil 8, solids and microorganisms and merely contains small residues of dissolved hydrocarbons. The clarified water 44 may then be discharged via a clarified water line 54 into a clarified water tank 33. The clarified water 44 may then for example, as explained in connection with FIG. 1, be used as injection water or, optionally after further treatment, for generating process steam or be sent for disposal. The mixture 40 remaining in the container 48 is concentrated in oil content by outflow of the clarified water 44. For example, when a desired or predetermined concentration of oil 8 in the mixture 40 is reached, the concentrated mixture 40a is passed via a discharge line 32 from the container 48 back into the storage reservoir 21, from where it is fed once again to the sump 22, where the concentrated oil 8 may be recovered.

Figure 3:
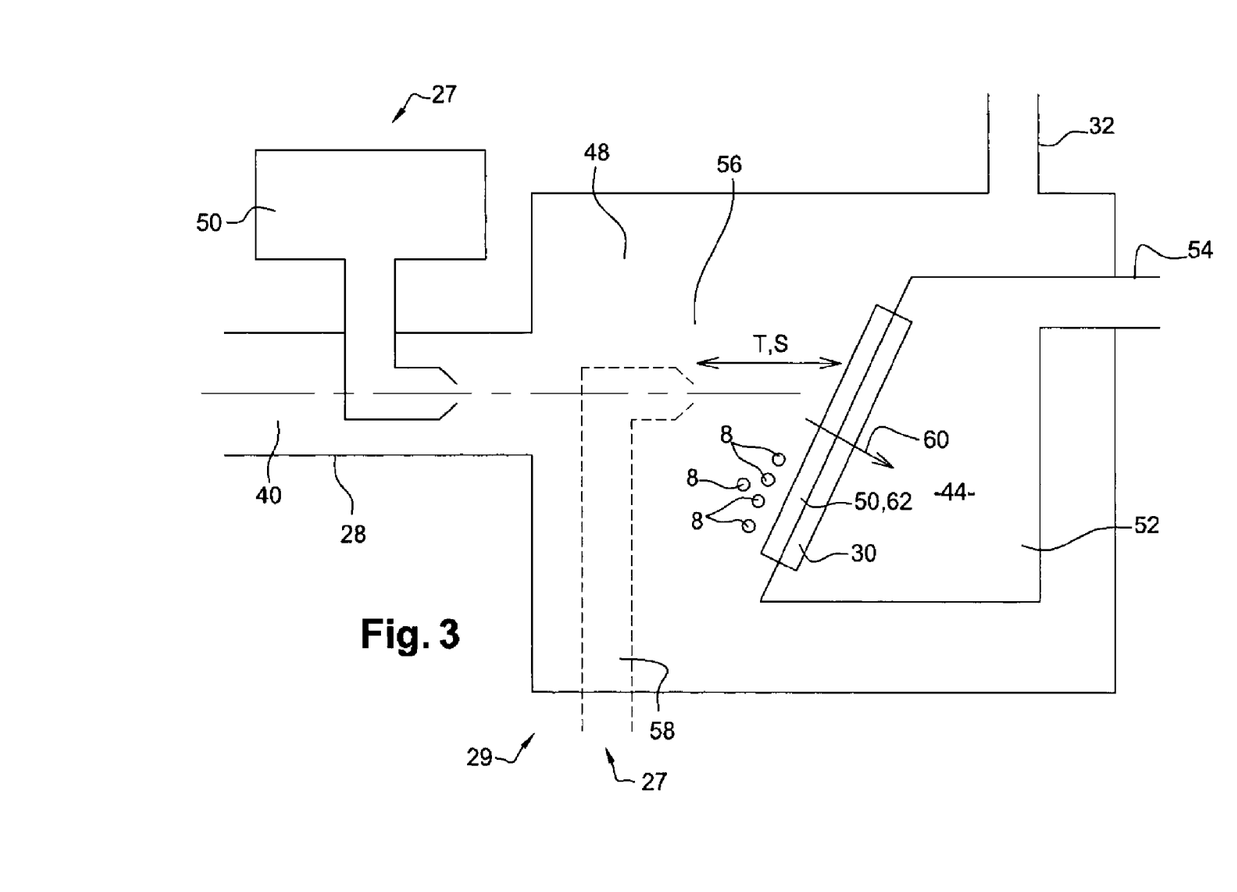
FIG. 3 shows the concentration unit from FIG. 2 in detail.

FIG. 3 shows the concentration unit 29 in detail. The protective material 50 apportioned to the mixture 40 by the addition device 27 passes along a flow path 56 of the mixture 40 in the container 48 to the membrane 30. The protective material 50, which assumes the form of hydrophilic micro- or nanoparticles, here rests on the membrane 30 in the form of a film 62. The film 62 or the protective material 50 prevents free oil 8 which is still present in the mixture 40 from resting on the membrane 30 and clogging the latter. The film 62 nevertheless allows clarified water 44 to pass along the direction of flow 60 through the membrane 30. In this manner, clogging, agglutination etc. of the membrane 30 by free oil 8 is prevented. Further clarified water 44 may accordingly always be drawn off from the mixture 40 in the container 48, whereby the mixture 40 is concentrated in oil 8 content.

When, for example, the filtration performance of the membrane 30 declines or at regular time intervals, the membrane 30 may be backflushed contrary to the direction of flow 60, for example with clarified water 44. The film 62 of protective material 50 is here detached from the membrane 30 and the membrane 30 can have a new film 62 of protective material 50 applied in order to regain its full filtration performance.

FIG. 3 shows in a preferred embodiment in dashed lines an addition device 27 which does not open into the feed line 28, but instead directly into the container 48. Said addition device also does not directly add the protective material 50 to the mixture 40 in the flow path 56, but instead an additive 58. The additive 58 contains the protective material 50 which is deposited as described above as a film 62 on the membrane 30. In an alternative embodiment, the additive 58 does not contain the protective material 50 directly or in finished form. Only once the additive 58 has come into contact with the mixture 40 does it react with the mixture 40 and so form the protective material 50 which then ultimately again rests as a film 62 on the membrane 30, in other words the protective material 50 is in this case indirectly added to the mixture 40.

FIG. 3 thus shows a device according to the invention comprising the container (48) which comprises an ultrafiltration unit (52) with a membrane (30), the feed line (28) for the mixture (40) opening into the container (48), the addition device (27) for the additive (58) or the protective material (50) which opens into the flow path (56) of the mixture (40) towards the membrane (30), the clarified water line (54) leading away from the ultrafiltration unit (52) downstream of the membrane (30) for clarified water (44) purified on passage through the membrane (30), and the discharge line (32) leading away from the container (48) for the mixture (40) concentrated in oil (8) content.

In the example, the additive 58 is a flocculating or precipitating agent which reacts chemically with water. Specifically, the additive used in the example is iron(III)

chloride, $FeCl_3$, at a concentration of between 0.1 and 20 mg/l, alternatively between 0.5 and 10 mg/l, alternatively and preferably between 1 and 5 mg/l. In this variant, on reaction with water, iron hydroxide is obtained as a hydrophilic protective material which is deposited on the membrane. In an alternative development, the additive may comprise aluminum chloride, $AlCl_3$, (which gives rise to aluminum hydroxide as protective material), but other protective materials 50 or reactants are in principle possible. A vital factor here is that the flocculating or precipitating agent is not used in the conventional manner or at the conventional rate of addition. Conventional precipitation does not occur here and no chemical or physical reaction occurs with the oil.

It should be noted that the additives used for the present method are not conventional precipitants for separating oil/water emulsions. In contrast with these conventional precipitants, the additives used here are extremely inexpensive and thus permit economic operation of the plant. Moreover, the additives used are added at a concentration which is many times lower than the concentration of precipitating agents in a conventional precipitation.

The plant is moreover dimensioned such that a transport time T is insufficient for a conventional flocculating or precipitating agent to form sufficiently large particles to enable conventional precipitation. The transport time T is the time required by the mixture to get from the point of apportionment of the additive 58 to the membrane 30, i.e. to cover a distance S. Specifically, the transport time T is adjusted, at a given flow velocity of the mixture 40 along the flow path 56, by positioning the addition device 27 at a suitable distance S from the membrane 30. Over the transport time T, only microscopically small particles of a predefinable maximum size can arise which form the protective material 50 and are deposited as a film 62 on the membrane 30.

The invention claimed is:

1. A method for purifying a mixture of water contaminated with oil, said method comprising the steps of:
   feeding the mixture to a container comprising an ultrafiltration unit with a membrane,
   purifying the mixture on passage through the membrane to yield clarified water,
   discharging said clarified water from the ultrafiltration unit downstream of the membrane,
   and discharging the mixture, which has been concentrated in oil content by said clarified water being drawn off, from the container,
   said method further comprising
   during purification, adding an additive to the mixture, said additive being added in the container on a flow path of said mixture towards the membrane such that the additive reacts with the mixture in said flow path and that a hydrophilic reaction product is formed as a protective material comprising particles of a maximum size in a micrometer range or in a nanometer range which come to rest on the membrane to form a film that keeps oil in the mixture away from said membrane, said additive being added at a concentration between 1 mg/l and 5 mg/l, wherein the additive comprises iron(III) chloride or aluminum chloride;
   detaching the film of protective material from the membrane by backflushing the membrane contrary to the direction of flow and applying a new film of protective material on the membrane; and
   adjusting a transport time required by the mixture to get from a point of apportionment of the additive to the membrane, at a given flow velocity of the mixture along the flow path of the mixture towards the membrane, such that only the particles of the maximum size can arise and form the protective material and be deposited as the film on the membrane.

2. The method according to claim 1, wherein the protective material is formed by a reaction of the additive with the mixture.

3. A method according to claim 2, in which a precipitating agent which interacts with the water is used as the additive.

4. A method according to claim 1, in which the mixture is fed to the container from a storage reservoir and the mixture discharged from the container is recirculated into the storage reservoir.

5. A method for extracting petroleum, in which purified process water which is produced by a method according to claim 4 is used as clarified water for reinjection into an oil field.

6. A method for producing purified process water for extracting and/or refining petroleum, in which the purified process water is produced as clarified water by a method according to claim 1 from process water contaminated with petroleum as a mixture.

7. A method for extracting and/or refining petroleum, in which purified process water which is produced by a method according to claim 6 is used as boiler feed water, desalting water and/or other recycled water.

8. A device for purifying a mixture of water contaminated with oil to yield clarified water according to the method of claim 1, the device comprising:
   a container which comprises an ultrafiltration unit with a membrane,
   a feed line, which opens into the container, for the mixture,
   a clarified water line leading away downstream of the membrane from the ultrafiltration unit for clarified water which is purified on passage through the membrane, and
   a discharge line leading away from the container for mixture which has been concentrated in oil content,
   wherein
   an addition device for an additive, said addition device opening, in the container, into a flow path of the mixture towards the membrane, wherein the addition device is arranged in such a manner that the additive reacts in the flow path with the mixture, such that a hydrophilic reaction product is formed as a protective material which comes to rest on the membrane as a film and thus keeps oil in the mixture away from the membrane, the protective material comprising particles of a maximum size in a micrometer or nanometer range.

9. A device according to claim 8, in which the addition device opens into the feed line.

10. A method according to claim 1, wherein the protective material comprises particles of a maximum size in a micrometer range.

11. A method according to claim 1, wherein the protective material comprises particles of a maximum size in a nanometer range.

12. A method according to claim 1, wherein the additive comprises iron(III) chloride.

13. A method according to claim 12, wherein the protective material comprises iron hydroxide particles.

14. A method according to claim 1, wherein the additive comprises aluminum chloride.

15. A method according to claim 14, wherein the protective material comprises aluminum hydroxide.

16. A method according to claim 1, where the mixture fed to the container has an oil content of 500 to 1000 mg/l.

17. A method according to claim 1, where the mixture fed to the container has an oil content of 200 to 5000 mg/l.

18. A method according to claim 1, wherein the additive is added to the mixture by an addition device, and adjusting the transport time comprises positioning the addition device at a distance from the membrane.

* * * * *